United States Patent [19]

Buss

[11] 4,407,439
[45] Oct. 4, 1983

[54] APPARATUS FOR DEPOSITING A WEB OF MATERIAL ON A TABLE

[75] Inventor: Albert Buss, Munsingen, Fed. Rep. of Germany

[73] Assignee: G. O. Stumpf GmbH & Co., Fed. Rep. of Germany

[21] Appl. No.: 363,294

[22] Filed: Mar. 29, 1982

[30] Foreign Application Priority Data

Apr. 3, 1981 [DE] Fed. Rep. of Germany ....... 3113619

[51] Int. Cl.³ ...................... B65H 25/26; B23Q 15/00; B26D 5/00
[52] U.S. Cl. ........................................ 226/20; 226/21; 83/74; 83/367
[58] Field of Search ........................ 226/18, 19, 20, 21, 226/22, 23, 112, 45; 83/74, 367, 418, 421, 925 CC

[56] References Cited

U.S. PATENT DOCUMENTS

| | | | |
|---|---|---|---|
| 2,722,415 | 11/1955 | Wood, Jr. ........................ | 226/23 X |
| 2,850,277 | 9/1958 | Clark ............................. | 226/18 |
| 2,877,397 | 3/1959 | Poschner et al. .................. | 226/45 X |
| 3,786,974 | 1/1974 | Kron ............................. | 226/19 |
| 3,807,611 | 4/1974 | Eder et al. ...................... | 226/20 |
| 3,940,042 | 2/1976 | Keck ............................. | 226/45 X |

FOREIGN PATENT DOCUMENTS

2407842  8/1975  Fed. Rep. of Germany ........ 226/21

*Primary Examiner*—Stuart S. Levy
*Assistant Examiner*—Scott J. Haugland
*Attorney, Agent, or Firm*—Scully, Scott, Murphy & Presser

[57] ABSTRACT

In order to deposit a web (13) onto a conveyer (2) of a table (1) with one edge aligned with a datum position, a carrier (9) is provided which is rotatable with respect to the table (1) and has an auxiliary conveyer (10). Rotation of the carrier (9) takes place in response to deviation of the actual position of the edge from the datum position, which is detected at the point of deposit of the web (13) onto the conveyer (2) by a suitable position detecting sensor (21). For rotating the carrier (9), a motor (20), whose direction of rotation and angle of rotation can be controlled, is used.

The apparatus can be used, in particular, for depositing webs of fabric removed from bolts (4) onto a laying table for cutting purposes.

8 Claims, 3 Drawing Figures

APPARATUS FOR DEPOSITING A WEB OF MATERIAL ON A TABLE

This invention relates to apparatus for depositing a web of material on a table.

When webs of fabric, removed from a bolt in a magazine, are deposited onto a conveyor of a laying table, it is important for one edge of the fabric to correspond with a datum position. In other words, the fabric should be deposited with the edge running in the straightest line possible. The difficulty is that the fabric is wound onto the bolt in a very arbitrary fashion, so that deviations of the actual edge of the fabric in the bolt from the desired edge position of up to ±25 cm are possible. Adjustment of the edge position is, therefore, necessary. Hitherto, for this purpose, the actual position of the edge was detected and the deviation from the datum position was determined. In response to this deviation, the entire bolt, or even the magazine containing the bolt, was displaced laterally until the desired and actual edge positions corresponded.

Adjustment of this kind is disadvantageous, since on the one hand considerable forces are required to adjust axially the bolt or the magazine. Considerable forces of inertia and momentum also arise so that, in addition, a large degree of hunting is to be expected.

An object of the invention is to specify an apparatus for edge control, which is constructed simply, avoiding the disadvantages mentioned and which attains small huntings.

According to the present invention there is provided apparatus for depositing a web of material on a table with one edge aligned with a datum position, the apparatus comprising a sensor for detecting deviations of the actual position of the edge from the datum position and a conveyor which is movable in a plane substantially parallel to the table, the conveyor being rotatable by drive means about an axis which is substantially perpendicular to the plane of the table in response to signals from the sensor, thereby to displace the web laterally to bring the edge into alignment with the datum position.

Advantageously, a controllable feed roller is provided for depositing the fabric in a tension-free manner.

An embodiment in accordance with the present invention achieves a comparatively simple construction with low inertia, which can be put into practice with little expense and which can respond very sensitively to deviations.

For a better understanding of the present invention and to show how it may be carried into effect, reference will now be made, by way of example, to the accompanying drawings, in which.

Figure 1:
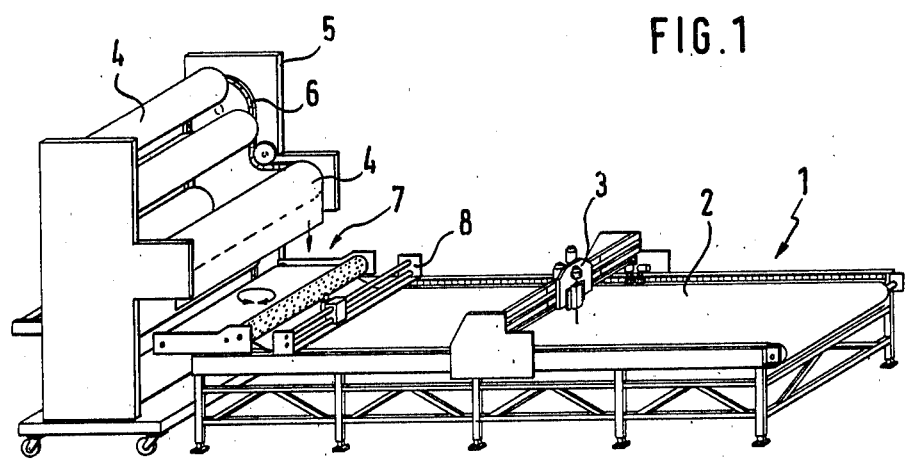
FIG. 1 shows fabric handling equipment comprising a magazine for bolts of fabric and a laying table.

FIG. 1 shows a fabric laying table 1 comprising a circulating conveyor belt 2 on which webs of fabric are to be deposited in one or more layers for the purpose of cutting. The cutting takes place with an automatically operated or manually operated cutting machine 3 which is positioned over the laying table 1. A web of fabric is transferred to the laying table 1 from a bolt 4 which is supported in a magazine 5 for several such bolts 4. The magazine 5 shown in FIG. 1 is a transporting and unwinding support for the bolts, in which the bolts 4 are mounted removably on chains 6 rotating in the magazine 5. In operation, fabric is wound off one of the bolts 4 and deposited on the conveyer belt 2 by means of laying apparatus 7. The laying table 1 is provided with a cutter 8, which severs a predetermined length of the deposited fabric from the bolt 4.

The bolt 4 can alternatively be contained in a fixed magazine. Furthermore, the bolt 4 could be inserted into a laying machine disposed above the laying table 1. It is essential that the fabric wound off the bolt 4 is supplied to the laying apparatus 7 from a higher level. The supply can take place under gravity or under drive of drawing-off apparatus.

The purpose of the laying apparatus 7 is to deposit the fabric wound off of the bolt 4 onto the conveyer belt 2 as precisely as possible in respect of edge alignment and as free of tension as possible. The latter requirement can be achieved by means of a feed roller with a controllable rate of revolution as will be explained further below.

A problem arising from the first requirement is that the fabric is not wound onto the bolt 4 nearly as regularly as might be desired, and the edges of the wound fabric can deviate in position by up to ±25 cm. However, particularly when multilayered cutting takes place, it is important for the fabric edges to be precisely aligned.

Since the deviations originate in the bolt 4, the method of eliminating these deviations has hitherto comprised the displacing of the entire bolt 4, or the whole magazine 5, in a direction parallel to the spindle of the bolt 4 to be unwound in response to the deviation of the actual fabric edge from a desired position. This follow-up can take place in an automated manner.

As a result, considerable forces are necessary to overcome the inertia and momentum of the bolt 4 or the magazine 5. The accuracy of the movement is therefore poor. In order that tension-free depositing of the fabric can take place, the laying apparatus 7 with the feed roller, which synchronizes the speed of deposit of the wound off fabric with the travelling speed of the conveyer belt 2, must at all events be adjoined to the laying platform.

Figure 2:
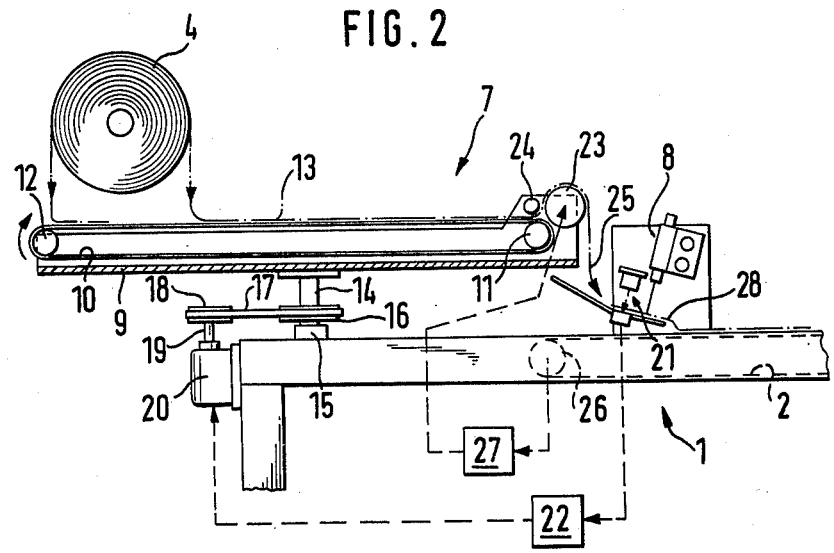
FIG. 2 is a partly sectional view of part of the equipment of FIG. 1.
Figure 3:
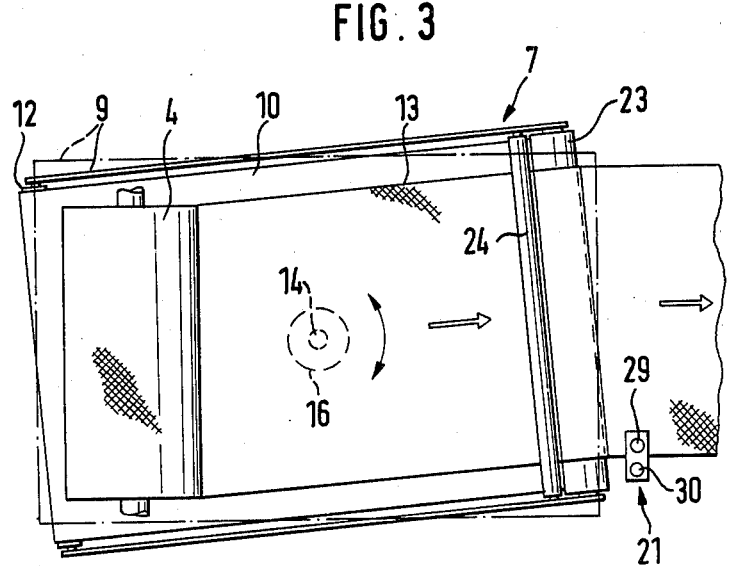
FIG. 3 is a plan view of the part of the equipment shown in FIG. 2.

The apparatus shown in FIGS. 2 and 3 overcomes this problem. The apparatus comprises a carrier 9 on which there is a circulating conveyer belt 10. The conveyer belt 10 moves in a plane which is parallel to the plane of movement of the conveyer belt 2. The conveyer belt 10 runs over guide rollers 11 and 12, of which the guide roller 11 nearer the laying table 1, rotates so that a length of fabric 13, which is deposited from above onto the conveyer belt 10 after being wound off the bolt 4, is transported to this guide roller 11 and runs off of the roller 11 in the direction of the conveyer belt 2. This direction of travel of the conveyer belt 10 is not subject to the direction of winding of the length of fabric 13 on the bale of fabric 4, as is diagrammatically represented by dash-and dot lines on both sides of the bolt 4 in FIG. 2. The carrier 9 is formed so that it is rotatable about an axis approximately passing through a centre line of the laying table 1. For this purpose a stub shaft 14 is attached to the carrier 9, this stub shaft 14 being mounted for rotation in a bearing 15 which is attached to the laying table 1. The stub shaft 14 carries a pulley 16 over which a belt 17 travels, this belt 17 also running over a pulley 18 which is mounted on an output shaft 19 of a motor 20 which is fixed relatively to the laying table 1, for example, as represented, by being attached to the table 1. The rotation of the carrier 9 by the motor 20 takes place in response to a comparison of the actual position of the fabric edge with a desired position.

A position detecting sensor 21 is provided for detecting the actual position of the edge. The sensor 21 is positioned near to the place where the fabric is deposited onto the conveyer belt 2. This position detecting sensor 21, which can comprise a light-emitting diode is, in the case of the embodiment represented, attached to the cutting device 8 to save space. In response to deviation of the detected actual position of the edge from the desired position of the edge, an adjustment signal is emitted by a regulator (not shown) and is fed to the motor 20, which then rotates the carrier 9 and therewith the conveyer belt 10 as is represented in FIG. 3.

FIG. 3 shows a comparatively large departure of the actual position of the edge of the fabric 13 on the bolt 4 from the desired position at the position detecting sensor 21. Hence there follows a correspondingly large rotation of the carrier 9 with respect to its normal position which is represented in FIG. 3 in dash-and-dot outline and which would be occupied when the reference edge of the bolt 4 corresponds with the desired position of the edge on the laying platform.

The carrier 9 may be rotated by means other than the transmission 16 to 18 which is represented. Other types of transmission can be used, or the motor 20 can act directly on the stub shaft 14.

The motor 20 should be capable of rotation in both directions, and is advantageously a stepping motor, by which the angular position of the output shaft 19 is displaced in small angular steps, the displacement taking place through impulses conveyed to the motor 20 from the regulator 22.

In this way, the reference edge of the fabric 13 can follow the desired position in a substantially inertialess manner. However the deposited fabric will not always be free of tension. To achieve this, a controllable feed roller 23 and an auxiliary roller 24 are mounted on the carrier 9. The feed roller 23 is at the end of the conveyer belt 10 from which the fabric 13 is deposited, whereby the fabric 13 passes from the conveyer belt 10 between the auxiliary roller 24 and the feed roller 23 and falls from the latter onto the laying platform 2 as indicated by an arrow 25. The depositing of the fabric 13 in a tension-free manner is achieved by synchronizing the rate of revolution of the feed roller 23 with the travel speed of the conveyer belt 2. For this purpose, the rate of revolution of a guide roller 26 of the conveyer belt 2 is detected and the rotary drive 27 for the feed roller 23 is adjusted in response to the rate of revolution of the guide roller 26 to alter the rate of revolution of the feed roller 23.

This entails very little extra size for the carrier 9. As an alternative, the rotary drive 27 for the feed roller 23 can also drive the conveyer belt 10 in which case speed synchronization for these parts is not required. On the contrary, it can be advantageous for there to be a build-up of fabric 13 removed from the bolt 4 before it is deposited from the feed roller 23. In this way a drive for removing the fabric 13 from the bolt 4 can, for example, be turned off once the fabric 13 has been supplied to the feed roller 23, that is, threaded between the auxiliary roller 24 and the feed roller 23.

As shown, there is a baffle plate 28 which deposits the fabric 13, directed over the feed roller 23, gradually onto the conveyer belt 2. The baffle plate 28 carries at least part of the position detecting sensor 21. By way of example, there can be provision at or in the baffle plate 28 for that portion of the position detecting sensor 21 which forms the receiver element for light-emitting diodes when these are used for detecting the position of the edge. Such position detecting sensors are known as such and have two light-emitting diodes 29 and 30 which are arranged in a line substantially perpendicular to the path of the desired position of the edge. Two receiver elements (not represented separately) are disposed adjacent the light-emitting diodes in an identical row.

The desired position of the edge is between the two transmitter/receiver pairs. In the desired position of the fabric 13 in the position detecting sensor 21, the optical path between one light-emitting diode, in this case the diode 29, and its adjoining receiver element is interrupted, while the path between the other light-emitting diode, in this case the diode 30, and the adjoining receiver element, is clear. Both optical paths being interrupted or cleared represents a deviation from the desired position of the edge, and, in response to this deviation, the regulator 22 gives out a corresponding adjustment signal to the motor 20.

The invention has been described above with reference to the depositing of webs of fabric, which have been wound off from bolts onto a conveyer belt. The invention can also be used in the same way for the depositing of other flat material.

I claim:

1. An apparatus for depositing a web of flexible material on a table with one edge aligned with a datum position, said apparatus comprising:
    (a) a conveyor means for advancing said flexible material to a feed rate control means;
    (b) said feed rate control means providing an adjustable and controllable feed rate for said flexible material, said feed control means having a feed roller, an auxiliary roller cooperating with said feed roller, and means for controlling the speed of said feed roller;
    (c) support means for said conveyor means and said feed rate control means, said support means positioned to rotate said conveyor about an axis which is substantially perpendicular to a horizontal plane of said table;
    (d) a two directional rotary stepping motor coupled to said support means to vary the angular orientation of said support means and said conveyor means;
    (e) a sensor means adapted to provide control signals in response to the deviation of the actual position of an edge of said web of flexible material from said datum position;
    (f) control means for receiving said control signals to vary the direction of rotation and the angle of rotation imparted by said stepping motor to said support means,
    whereby said flexible web is deposited on to said table in a tension free manner with said edge precisely aligned with respect to said datum position.

2. Apparatus as claimed in claim 1, further comprising a cutting device, and a support connected to the table and on which the cutting device is mounted, and wherein the sensor is carried by the support.

3. Apparatus as claimed in claim 1, further comprising:
    means for supporting a bolt from which fabric is to be withdrawn and deposited on the table, the said means being disposed directly above a portion of the conveyor means.

4. Apparatus as claimed in claim 1, further comprising a main conveyor provided on the table, and wherein means is provided for controlling the speed of the feed roller in response to the travel speed of the main conveyor.

5. An apparatus as claimed in claim 1 wherein said sensor means further comprises first and second photo diodes, with said datum position being located between said diodes.

6. An apparatus as claimed in claim 1 which further comprises:

(a) a main conveyor provided on said table for receiving said flexible material;
(b) control means to synchronize said feed roller control means and said main conveyor to provide a tension free supply of flexible material to said main conveyor.

7. An apparatus as claimed in claim 6 wherein said support means is supported by a single rotary shaft, said shaft being rotated by said step motor in response to control signals from said sensor means.

8. An apparatus as claimed in claim 6 wherein a single drive motor rotates both said main conveyor and said adjustable feed roller, said control means thereby regulating the speed of both the feed roller and the main conveyor.